Aug. 28, 1928.
A. V. J. GUILLET ET AL
1,682,725
APPARATUS FOR DETERMINING THE FREQUENCY OF ROTATION
OR OSCILLATION OF MOVING PARTS
Filed Dec. 4, 1925    3 Sheets-Sheet 2
Fig. 1ª.
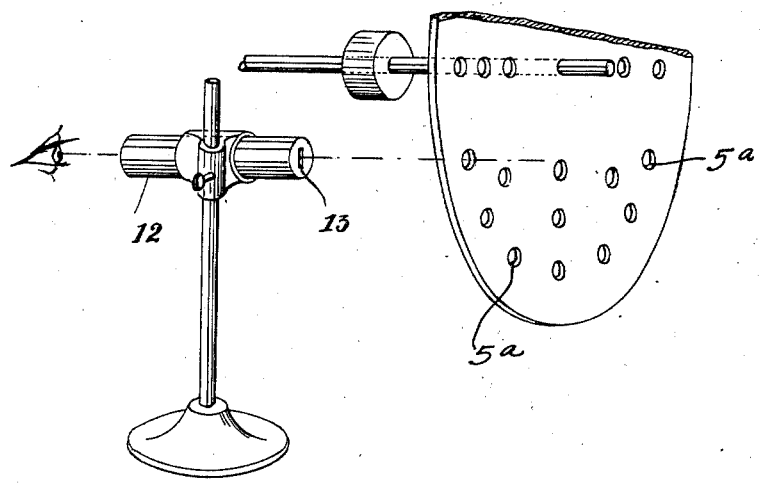
Fig. 2.
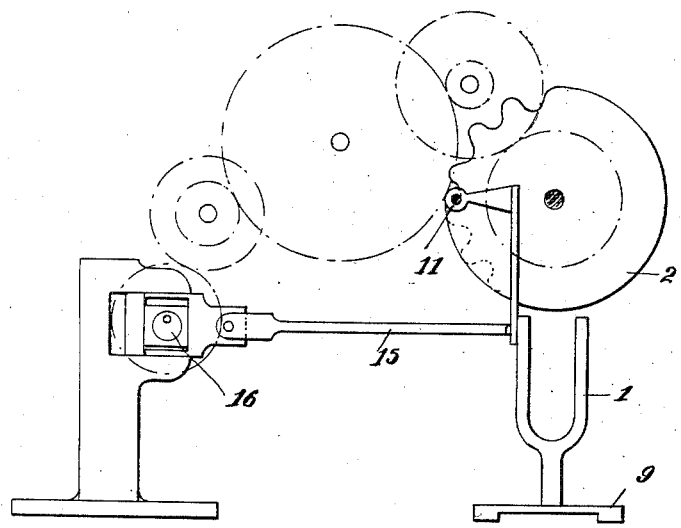
INVENTORS
A.V.J. Guillet and
A. Bertrand
by Langner, Parry, Card & Langner Att'ys

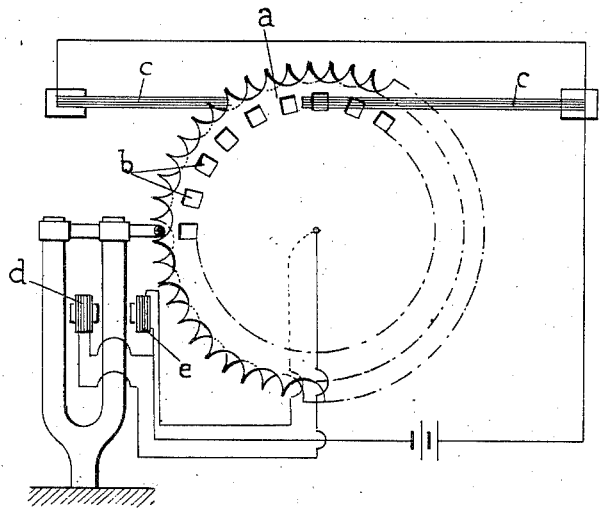
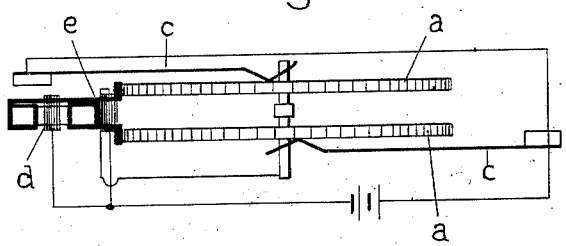
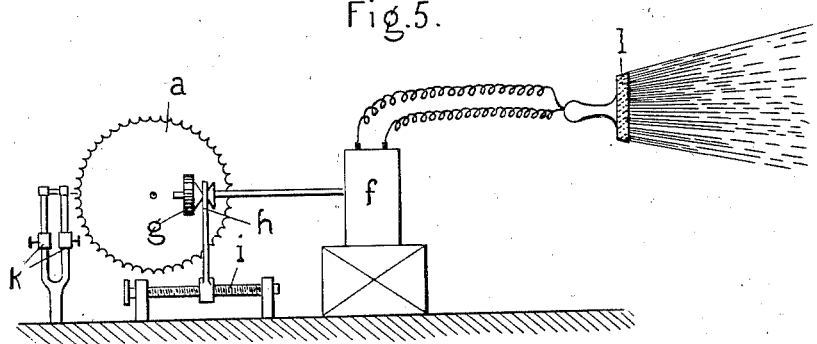

Patented Aug. 28, 1928.

1,682,725

UNITED STATES PATENT OFFICE.

AMÉDÉE VICTOR JOSEPH GUILLET AND ALEXANDRE BERTRAND, OF PARIS, FRANCE.

APPARATUS FOR DETERMINING THE FREQUENCY OF ROTATION OR OSCILLATION OF MOVING PARTS.

Application filed December 4, 1925, Serial No. 73,286, and in France December 10, 1924.

The invention is illustrated in the drawings in which

Fig. 1 is a perspective view of the apparatus in the form of a disc stroboscope.

Fig. 1$^a$ is a perspective view of a method of utilizing the disc stroboscope.

Fig. 2 is an elevation of the apparatus used for cutting the teeth of the chronometric motor.

Fig. 3 is an elevation of an embodiment of the chronometric motor and of the method of supporting the tuning fork.

Fig. 4 is a corresponding plan view.

Fig. 5 is an elevation of a chronometric motor used to produce stroboscopic flashes by means of a neon lamp.

Figure 1:
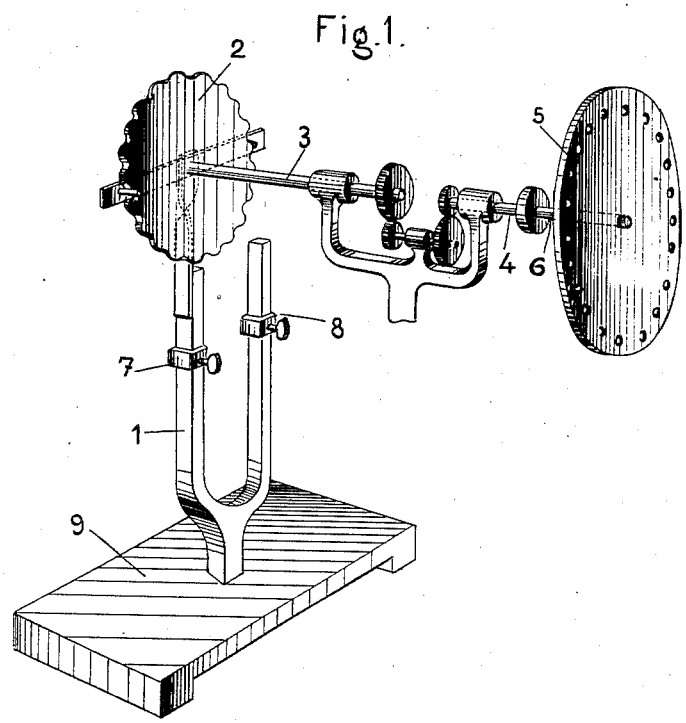

The determination of the frequency of rotation or oscillation of a material part is a current operation in the laboratory and the workshop. The recent apparatus invented for this purpose all have their advantages and their disadvantages: the simultaneous registration of the periods of the phenomenon to be followed and of the time is comparatively laborious or requires a contrivance which can react upon the mechanism to be controlled. Stroboscopic observation by vibrators cannot cover the whole field of practical frequencies except by the use of several vibrators, sometimes of different types—torsional oscillations—transverse oscillations, but they furnish directly their proper frequency in each of their states, due to a preliminary calibration or standardization.

On the other hand, the stroboscope with driving motor and perforated disc, which presents great flexibility from the point of view of the field of frequency, leaves the operator in ignorance of the angular velocity corresponding to the stroboscopic reading obtained.

A perfect solution of the problem is obtained by driving the stroboscope by means of a chronometric motor consisting of an electrically sustained tuning fork of which the prongs or legs have fingers or pegs acting in the manner of an escapement anchor upon a suitable toothed ring revolving around an axis perpendicular to the plane of the tuning fork. In this way the valuable properties of vibrators (tuning forks)—which are truly auxiliary time counters—are associated with the rotary movement actuating the stroboscope.

There will thus be obtained an accurate, universal and practical frequency-meter, by driving, by means of a tuning fork 1 of frequency $n$ (Figure 1) and a wheel 2 having $Q$ teeth at its periphery, the spindle 4 upon which is mounted the apertured disc 5. The angular velocity of the shaft 3 of the chronometric motor is $\frac{n}{Q} \times 2\pi$, that of the stroboscopic spindle is $\rho \frac{n}{Q} 2\pi$, if $\rho$ is the velocity ratio of the gear train connecting the spindles 3 and 4 together. Thus, when the chronometric motor makes $\frac{n}{Q}$ revolutions, the shaft 4 makes $\rho \frac{n}{Q}$ revolutions and if the number of apertures evenly divided around one of the circumferences of the disc is N, the corresponding stroboscopic frequency will be $\rho \frac{n}{Q} N$.

A single disc has several series of holes 5$^a$ spaced around circles or circumferences of different radii, and there can be utilized several discs provided with different series of holes. Observation is made through a tube 12, itself having a radial slit 13; this tube can be displaced by translation so as to bring the slit to the level of the circumference utilized. The discs may be mounted upon an auxiliary spindle 6 which is held fast to the driving shaft 4 or freed therefrom by clutching and declutching; in this way the disc can be changed without having to stop the motor. Cursors 7 and 8, fixed at such points on the legs of the tuning fork 1 as may be necessary, allow of varying the frequency $n$ between known limits $n_0$ $n_1$.

An arrangement of this kind allows of ascertaining rapidly and accurately not only the angular velocity of a motor at any instant, but also the frequency of an oscillator, tuning fork or string, by stroboscopic immobilization or by estimating the reduced angular velocity which might still subsist.

The entire accuracy of the frequency-meter herein described depends upon a perfect connection between tuning fork and the wheel system.

In order to obtain uniform rotation, it is advantageous to construct the wheels in place.

Having selected the tuning fork 1 (Fig. 2) it is affixed to its support 9, one of its arms is provided with a member 10 in the form of a square at the end of which is mounted a cylindrical cutter 11 for cutting the teeth of disc 2; this cutter occupies exactly the same position occupied by the corresponding drive or entraining lug 14 of the apparatus (Fig. 1). For cutting the teeth we impart to the arm of diapason 1, by means of the rod 15 connected to the frame eccentric 16, a slow oscillatory movement having the same amplitude as the diapason when it enters into vibration; we impart to the cylindrical cutter 11 a rapid rotary movement about its axis while the disc 2 is rotated at a speed equal to $\frac{1}{Q}$ of the speed of the frame eccentric 16, if the number of teeth to be cut on disc 2 should equal Q. It is apparent that under these conditions the cutter will cut on disc 2 a denture (teeth) the profile of which will correspond exactly to the movement described by the entraining lug 14 under the action of the vibrations of the diapason.

The application of a chronometric motor to the determination of the frequency of rotation or oscillation of a moving part may also be carried into effect by using this motor to drive an induction generator (high-tension ignition or other magneto), employed for producing stroboscopic flashes, for example by means of a neon tube.

This utilization of the chronometric motor in place of a motor of any other kind allows of ensuring absolute regularity in the rhythm of the flashes or illuminations. It is of course necessary to provide a chronometric motor of sufficient power, by reason of the work involved in driving the induction generator. For this reason the tuning fork must be rugged and of dimensions (length, width and thickness) as large as possible.

The power developed (W) is equal in fact to:

$$W = 13.15 \ M^1. \ A. \ \Delta A. N^3$$

where $M^1$ is the mass of the whole of the two branches of the tuning fork.

A is the amplitude of operation, $\Delta A$ is the variation of amplitude permissible per period, and N is the frequency.

For $M^1 = 5$ kilograms, $N = 200$, $A = 3$ m/m, $\Delta A = 3$ m/m, the power developed is of the order of half a horse power.

The ampere-turns of the motor are calculated so as to ensure this transmission of energy from the source of current to the receiver.

For this the attractional force must be:

$$F = \frac{W}{N \times 4\epsilon}$$

$\epsilon$ being the amplitude with regard to the core of the electromagnet.

The ampere-turns necessary are given by the formula $$Ni_{amp} = 125 \frac{l}{\mu} \frac{Fgr}{S}$$

S being the sectional area of the core of which the diameter is sure to be almost equal to the width of the branch.

In order that this power may be obtained, a double-effect sustaining action is provided by utilizing an inner electromagnet and an outer one, each acting for half the duration of the period: the inner one when the branches are coming together, and the outer one on the contrary when the branches are moving away from one another.

For this purpose, it is sufficient, as represented diagrammatically in Figures 3 and 4 of the annexed drawing, to form in each of the wheels $a$ of the chronometric motor (or in crowns having the same axes as the wheels) cavities $b$ of width equal to one half tooth, and to provide a tangential brush $c$ rubbing upon each wheel or crown, the brush consisting of a bundle of thin flexible copper wires. As the two wheels are offset by one half tooth, the two brushes serve to produce excitation of the two sustaining magnets $d$ and $e$ alternately.

In order to obtain the variation of frequency necessitated by the stroboscopic readings, there may be interposed between the chronometric motor and the induction generator a change-speed mechanism with gear wheels, friction drive or the like.

Figure 5 represents a diagram of the complete arrangement, in which the chronometric motor $a$ actuates the high tension magneto $f$ by means of a friction roller $g$ running either upon the wheel of the chronometric motor itself or upon a disc keyed to the motor spindle. In order to vary progressively the speed of the magneto, this roller may be given a longitudinal displacement by means of a striking fork $h$ actuated by a screw $i$. The frequency of the sparks or flashes may also be varied within certain limits by moving the masses $k$ along the prongs of the tuning fork.

In the example represented, the magneto $f$ serves to illuminate a neon tube $l$.

The device which has been described above may be constituted in the form of a portable apparatus comprising all the parts necessary to its operation.

What we claim is:

1. An apparatus for determining the frequency of rotation or oscillation of a moving part, comprising in combination, an electrically sustained tuning fork, an escapement anchor device carried thereby, rotary means adapted to revolve around an axis perpendicular to the plane of the tuning fork and actuated by said escapement anchor device, and a stroboscopic member actuated by said rotary means.

2. An apparatus for determining the frequency of rotation or oscillation of a moving part, comprising, in combination, an electrically sustained tuning fork, an escapement anchor device carried thereby, rotary means adapted to revolve around an axis perpendicular to the plane of the tuning fork and actuated by said escapement anchor device and a stroboscopic member actuated by said rotary means, together with a change speed mechanism between the said rotary means and the said stroboscopic member.

3. An apparatus for determining the frequency of rotation or oscillation of a moving part, comprising in combination, an electrically sustained tuning fork, an escapement anchor device carried thereby, rotary means adapted to revolve around an axis perpendicular to the plane of the tuning fork and actuated by said escapement anchor device, and means, adapted to produce stroboscopic flashes, actuated by said rotary means.

4. An apparatus for determining the frequency of rotation or oscillation of a moving part, comprising, in combination, an electrically sustained tuning fork, an escapement anchor device carried thereby, rotary means adapted to revolve around an axis perpendicular to the plane of the tuning fork and actuated by said escapement anchor device and an induction generator, actuated by said rotary means and cooperating with means, adapted to produce stroboscopic flashes.

5. An apparatus for determining the frequency of rotation or oscillation of a moving part, comprising, in combination, an electrically sustained tuning fork, an escapement anchor device carried thereby, rotary means adapted to revolve around an axis perpendicular to the plane of the tuning fork and actuated by said escapement anchor device, an induction generator, actuated by said rotary means, and a tube filled with rarefied gases supplied with current by said induction generator and adapted to produce stroboscopic flashes.

6. An apparatus for determining the frequency of rotation or oscillation of a moving part, comprising, in combination, an electrically sustained tuning fork, an escapement anchor device carried thereby, rotary means adapted to revolve around an axis perpendicular to the plane of the tuning fork and actuated by said escapement anchor device, and a stroboscopic member actuated by said rotary means, electromagnet means arranged between the prongs of the tuning fork, electromagnet means arranged without said fork, and electrical means, controlled by the rotation of the rotary means, adapted to alternately actuate each of said inner and outer electromagnet means for one half duration of the oscillation period of the tuning fork.

In testimony whereof we have signed our names to this specification.

AMÉDÉE VICTOR JOSEPH GUILLET.
ALEXANDRE BERTRAND.